US012651758B2

(12) United States Patent
Girschik

(10) Patent No.: US 12,651,758 B2
(45) Date of Patent: Jun. 9, 2026

(54) CELL FRAME, ELECTROCHEMICAL CELL, CELL STACK AND OPERATING METHOD

(71) Applicant: Fraunhofer-Gesellschaft zur Förderung der angewandten Forschung e.V., Munich (DE)

(72) Inventor: Jan Girschik, Oberhausen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 575 days.

(21) Appl. No.: 18/013,988

(22) PCT Filed: Jul. 1, 2021

(86) PCT No.: PCT/EP2021/068187
§ 371 (c)(1),
(2) Date: Dec. 30, 2022

(87) PCT Pub. No.: WO2022/003106
PCT Pub. Date: Jan. 6, 2022

(65) Prior Publication Data
US 2023/0290974 A1 Sep. 14, 2023

(30) Foreign Application Priority Data
Jul. 1, 2020 (DE) ..................... 10 2020 117 367.9

(51) Int. Cl.
*H01M 8/04082* (2016.01)
*H01M 8/18* (2006.01)

(52) U.S. Cl.
CPC ....... *H01M 8/04201* (2013.01); *H01M 8/188* (2013.01)

(58) Field of Classification Search
CPC .... H01M 8/04201; H01M 8/188; H01M 8/18; H01M 8/0258; H01M 8/0289; H01M 8/2459; Y02E 60/50
(Continued)

(56) References Cited

U.S. PATENT DOCUMENTS 4,518,663 A * 5/1985 Kodali ................ H01M 10/365
429/70
6,524,452 B1 * 2/2003 Clark ...................... C25B 15/08
429/513
(Continued)

FOREIGN PATENT DOCUMENTS

CN 109411782 A 3/2019
DE 102011122010 A1 6/2013
(Continued)

*Primary Examiner* — Christian Roldan
(74) *Attorney, Agent, or Firm* — The Webb Law Firm

(57) ABSTRACT

Described and illustrated is a cell frame for forming an electrochemical cell, in particular of a redox flow battery, peripherally enclosing at least one cell interior and including at least one feed channel for feeding electrolyte into the cell interior, wherein the feed channel has an inlet opening, spaced from the cell interior, for the electrolyte to be fed and an outlet opening, adjacent to the cell interior, for the electrolyte to be fed to flow out into the cell interior. In order that the power density can be increased, it is provided that the feed channel has at least one transport channel, connecting at least in sections the inlet opening with the outlet opening, for transporting the electrolyte through the feed channel into the cell interior and at least one return channel for partially returning the electrolyte to be fed counter to the transport direction (T) of the electrolyte to be fed in the transport channel, in that the return channel is in fluid contact with the transport channel via in each case at least one entry opening for entry of the electrolyte to be returned and exit opening for exit of the electrolyte to be returned, (Continued)

spaced from one another in the transport direction (T) of the electrolyte to be fed.

19 Claims, 3 Drawing Sheets

(58) Field of Classification Search
    USPC ......................................................... 429/513
    See application file for complete search history.

(56) References Cited

U.S. PATENT DOCUMENTS

| | | | |
|---|---|---|---|
| 2004/0170893 A1 | 9/2004 | Nakaishi et al. | |
| 2012/0058370 A1* | 3/2012 | Kell | H01M 10/4214 |
| | | | 429/51 |
| 2013/0078539 A1* | 3/2013 | Brandt | F23G 7/06 |
| | | | 429/408 |
| 2014/0093804 A1 | 4/2014 | Kreiner et al. | |
| 2014/0377688 A1 | 12/2014 | Dotsch et al. | |
| 2017/0309969 A1 | 10/2017 | Miller et al. | |
| 2020/0003884 A1 | 1/2020 | Arkind et al. | |
| 2021/0066762 A1 | 3/2021 | Miller et al. | |

FOREIGN PATENT DOCUMENTS

| | | | |
|---|---|---|---|
| EP | 1051766 B1 | 11/2000 | |
| JP | S4717011 U | 10/1972 | |
| JP | S57500232 A | 2/1982 | |
| WO | 8101966 A1 | 7/1981 | |
| WO | 2013092898 A1 | 6/2013 | |
| WO | 2017189680 A1 | 11/2017 | |
| WO | 2018065533 A1 | 4/2018 | |

* cited by examiner

CELL FRAME, ELECTROCHEMICAL CELL, CELL STACK AND OPERATING METHOD

CROSS-REFERENCE TO RELATED APPLICATIONS

This application is the United States national phase of International Application No. PCT/EP2021/068187 filed Jul. 1, 2021, and claims priority to German Patent Application No. 10 2020 117 367.9 filed Jul. 1, 2020, the disclosures of which are hereby incorporated by reference in their entireties.

BACKGROUND OF THE INVENTION

Field of the Invention

The invention relates to a cell frame for forming an electrochemical cell, in particular of a redox flow battery, peripherally enclosing at least one cell interior and comprising at least one feed channel for feeding electrolyte into the cell interior, wherein the feed channel has an inlet opening, spaced from the cell interior, for the electrolyte to be fed and an outlet opening, adjacent to the cell interior, for the electrolyte to be fed to flow out into the cell interior. In addition, the invention relates to an electrochemical cell and a cell stack having such a cell frame. Furthermore, the invention relates to a method of operation of such an electrochemical cell or of such a cell stack.

Description of Related Art

Electrochemical cells are known in different designs and are partly also referred to as electrochemical reactors, since electrochemical reactions take place in the electrochemical cells. Depending on their use, the electrochemical cells can be designed, for example, as galvanic cells in the form of electrochemical current sources that supply usable electrical energy through chemical reactions at the different electrodes. Alternatively, however, the electrochemical cells can also be electrolysis cells, that serve the production of certain products by applying an external voltage. Accumulator cells serve alternately as a current source, like galvanic cells, and additionally as a current storage, as in the case of an electrolysis cell.

SUMMARY OF THE INVENTION

The present invention can be used in all types of electrochemical cells. However, the invention is quite particularly preferred in connection with accumulator cells and here preferably in connection with redox flow batteries, which themselves have been known for a long time and in different designs. Such designs are described by way of example in EP 0 051 766 A1 and US 2004/0170893 A1. An important advantage of the redox flow batteries lies in their suitability to be able to store very large amounts of electrical energy. The energy is stored in electrolytes that can be kept available in very large tanks in a space-saving manner. The electrolytes usually comprise metallic ions of different oxidation states. To extract electrical energy from the electrolytes or to recharge the same, the electrolytes are pumped through a so-called electrochemical cell.

The electrochemical cell is formed from two half cells which are separated from each other via a separator in the form of a semipermeable membrane and each have an electrolyte and an electrode. The semipermeable membrane has the task of spatially and electrically separating the cathode and the anode of an electrochemical cell from one another. The semipermeable membrane must therefore be permeable to ions, which cause the conversion of the stored chemical into electrical energy or vice versa. Semipermeable membranes can be formed, for example, from microporous plastics as well as nonwovens made of glass fiber or polyethylene and so-called diaphragms. At both electrodes of the electrochemical cell, redox reactions take place, wherein electrons are released by the electrolytes at one electrode and electrons are accepted by the electrolytes at the other electrode. The metallic and/or non-metallic ions of the electrolytes form redox pairs and consequently generate a redox potential. As redox pairs, for example, iron-chromium, polysulfide-bromide or vanadium can be considered. These or also other redox pairs can basically be present in aqueous or non-aqueous solution.

The electrodes of a cell, between which a potential difference is formed as a result of the redox potentials, are electrically connected to each other outside the cell, e.g. via an electrical consumer. While the electrons get outside the cell from one half cell to the other, ions of the electrolytes pass directly from one half cell to the other half cell through the semipermeable membrane. To recharge the redox flow battery, a potential difference can be applied to the electrodes of the half cells instead of the electrical consumer, for example by means of a charging device, by which potential difference the redox reactions taking place at the electrodes of the half cells are reversed.

For forming the described cell, among other things cell frames are used which enclose a cell interior. The cell frames typically do not completely enclose the cell interior, but only along a circumferential narrow side. Thus, the cell frame runs peripherally circumferentially around the cell interior and separates two opposite larger-area sides from each other, which in turn are assigned to a semipermeable membrane or an electrode. The thickness of the cell frame, which is formed by the edge of the cell frame, is typically significantly smaller than the width and the height of the cell frame, which define the larger-area opposite sides.

Each half cell of the electrochemical cell comprises such a cell frame, which are manufactured, for example, in an injection molding process from a thermoplastic material. Between two cell frames, a semipermeable membrane is arranged which separates electrolytes of the half cells from each other with regard to a convective mass exchange, but allows a diffusion of certain ions from one half cell into the other half cell. To each of the cell interiors, moreover, an electrode is assigned in such a way that they are in contact with the electrolytes flowing through the cell interiors. The electrodes can, for example, completes the cell interior of each cell frame on the side facing away from the semipermeable membrane. The cell interior can remain substantially free and be filled only by one electrolyte in each case. However, the respective electrode can also be provided at least partially in the cell interior. Then, the electrode is typically designed such that the electrolyte can flow partially through the electrode. In many cases, electrodes with a high specific surface are considered here, at which the respective electrochemical reactions can take place respectively quickly and/or extensively. This finally leads to a high volume-specific performance of the cell. However, even if the electrode extends into the cell interior, the cell interiors are usually closed by the electrode on the side facing away from the semipermeable membrane. As a non-porous part of the electrodes, so-called bipolar plates are also considered, which, for example, can be coated with a reactor or another substance.

Each cell frame has openings and channels through which the respective electrolyte can flow from a supply line into the respective cell interior and be drawn off again from there and fed to a disposal line. In the course of this, the electrolytes of the half cells are pumped via the supply line and the disposal line from a storage container into a collection container. This allows the electrolytes to be reused, which consequently do not have to be discarded or replaced.

If the redox flow battery comprises only a single cell, supply lines for each half cell and disposal lines for each half cell are present outside the cell frames forming the half cells. Each cell frame has at least two openings, at least one of which is connected to a supply line, while the at least one other opening is connected to the disposal line. Inside the cell frame, each opening is connected to a flow channel that is open to the cell interior. This allows electrolyte to be fed from the supply line to the cell interior via a feed channel and the electrolyte flowed through the cell interior to be discharged via a discharge channel. In order to distribute the electrolyte more uniformly over the width of the cell interior and to draw off the electrolyte more uniformly over the width of the cell interior, the respective feed channel and/or discharge channel can be branched once or several times between the outer opening and the cell interior, i.e. in the region of the frame shell of the cell frame. Alternatively, a series of separate feed channels and/or discharge channels for feeding respectively discharging electrolyte may be provided in the cell frame. In both cases, the electrolyte enters the cell interior as uniformly distributed as possible via the outlet openings of the feed channels of one side of the cell frame and exits the cell interior again as uniformly distributed as possible via the discharge channels of the other side of the cell frame. In this way, it is tried to achieve a flow through the cell interior that is as uniform as possible. The feed channels are connected at their other end to the supply line via inlet openings. This allows the electrolyte to get from the supply line through the at least one feed channel of the cell frame of each half cell into the respective cell interior.

If necessary, a plurality of electrochemical cells of the same type are combined in a redox flow battery. The cells are usually stacked on top of each other for this purpose, which is why the entirety of the cells is also referred to as a cell stack or cell stack. The individual cells usually are flowed through in parallel to one another by the electrolytes, while the cells are usually electrically connected in series. The cells are thus usually connected hydraulically in parallel and electrically in series. In this case, the charge state of the electrolytes is the same in each case in one of the half cells of the cell stack. To distribute the electrolytes to the respective half cells of the cell stack and to collectively discharge the electrolytes from the respective half cells, half cells are connected among one another with supply and disposal lines. Since each half cell respectively each cell interior of a cell is flowed through by a different electrolyte, the two electrolytes must be separated from each other during the passage through the cell stack. Therefore, two separate supply lines and two separate disposal lines are generally provided along the cell stack. Each of these channels is generally formed in part by the cell frames themselves, which have four bores for this purpose. The bores extend along the cell stack and form, arranged one behind the other and, if necessary, separated from each other by sealing materials, the supply and disposal lines.

In a plurality of electrochemical cells, it has been shown that, in order to increase the power density, it is expedient if the electrodes at least in one of the half cells at least partially engage into the cell interior, are porous and are flowed through by the respective electrolyte. However, the increase of the power density is often not satisfactory. This indicates that the surface provided by the electrode is not fully utilized or not utilized as effectively as possible. This can be explained by non-uniform flow through the electrodes, as can be observed also in the flow through similar porous solids. Even slight non-uniformities in the porosity lead to non-uniform flow, since the pressure losses depend strongly on the respective free flow cross-sections and the volume flow.

Therefore, the present invention is based on the task of designing and further developing the cell frame, the electrochemical cell, the cell stack and the method, each of the type mentioned at the beginning and described in more detail above, in such a way that the power density can be increased.

This task is solved in a cell frame according to the invention in that the feed channel has at least one transport channel, connecting at least in sections the inlet opening with the outlet opening, for transporting the electrolyte through the feed channel into the cell interior and at least one return channel for partially returning the electrolyte to be fed counter to the transport direction of the electrolyte to be fed in the transport channel, in that the return channel is in fluid contact with the transport channel via in each case at least one entry opening for the entry of the electrolyte to be returned and exit opening for exit of the electrolyte to be returned, the entry opening and exit opening being spaced from one another in the transport direction of the electrolyte to be fed.

Said task is also solved in an electrochemical cell according to the invention.

Said task is further solved in a cell stack according to the invention.

Furthermore, the aforementioned task is solved by a method of operation of an electrochemical cell according to the invention or of a cell stack according to the invention,
   in which electrolyte is fed to at least one cell interior of at least one cell frame of at least one half cell via a feed channel,
   in which the electrolyte, when flowing through the transport channel, in particular the flow chamber, forms temporally alternately at least two different main flows into the direction of the outlet opening and, as a result of this, flows alternately in at least two different outlet directions out of the outlet opening into the cell interior.

The invention has found that it is expedient in terms of the power density if the feed channel is divided into at least one transport channel and at least one return channel. In this case, the transport channel extends between an inlet opening for inlet of the electrolyte to be fed to an outlet opening of the electrolyte to be fed for the electrolyte to be fed to flow out into the cell interior. The inlet openings and the outlet openings of the feed channel and of the transport channel can coincide. However, this does not have to be the case. At least, however, it will be the case that the inlet opening of the feed channel and the outlet opening of the feed channel are connected to one another at least in sections via the transport channel.

Furthermore, it may be appropriate if the inlet opening of the at least one feed channel define the transition of the electrolyte to be fed from the supply line into the feed channel and the outlet opening of the feed channel define the transition of the electrolyte into the cell interior. However, this need not be so either. In particular, designs of a cell frame are conceivable in which it cannot be decided with absolute certainty where exactly the supply line ends and the feed channel begins or where exactly the feed channel ends and the cell interior begins. However, this is also of subordinate importance for the present invention, since the specific extension of the feed channel is less important than the flow in the feed channel. Furthermore, a feed channel can be understood to be a feed line if the feed channel is peripherally completely received in the cell frame. However, it may also be sufficient if the feed channel is incorporated into the cell frame as an open channel, which can simplify the production of the cell frame, for example in an injection molding process. The feed channel is then closed by a component adjoining the respective side of the cell frame for forming a feed line. The same applies here also to the transport channel and the return channel.

The return channel branches off from the transport channel and returns the branched-off electrolyte into a region of the transport channel which, viewed in the direction of flow of the electrolyte in the transport channel, is provided before the branch into the return channel. Thus, part of the electrolyte is returned respectively part of the electrolyte is guided in a circle in the feed channel. The electrolyte to be returned accordingly enters the entry opening of the return channel from the transport channel and re-enters the transport channel of the feed channel via the exit opening, namely in the transport direction before the entry opening. The returned electrolyte thus interacts in the region of the exit from the return channel back into the transport channel with the electrolyte to be fed flowing through the transport channel.

This interaction depends, for example, on the angle between the exiting returned electrolyte and the electrolyte to be fed flowing through the transport channel in this region in the transport direction. Moreover, this angle is preferably fixedly predetermined by the design of the feed channel. However, the respective interaction also depends on the volume flow and the velocity of the electrolyte returned again into the transport channel. The flow of the returned electrolyte can thus deflect the flow of the electrolyte to be fed in the transport channel to varying degrees, depending on how much electrolyte is returned and/or at what velocity the returned electrolyte flows out of the exit opening of the return channel into the transport channel.

The feed channel can be designed such that the intensity of the interaction of the returned electrolyte with the electrolyte to be fed in the region of the exit opening of the return channel has an influence on how much respectively what proportion of the electrolyte to be fed enters the return channel via the at least one entry opening instead of being fed to the outlet opening of the transport channel respectively of the feed channel. This is particularly expedient if a large volume flow of the electrolyte flowing back into the transport channel via the exit opening of the return channel influences the flow of the electrolyte in the transport channel in such a way that, as a result, a smaller volume flow of electrolyte to be returned enters the return channel via the entry opening. This reduces the influence on the flow of the electrolyte to be fed by the returned electrolyte in the region of the exit opening of the return channel, which, with a suitable design of the feed channel, can in turn be used so that the flow of the electrolyte to be fed flows through the transport channel in such a way that a larger volume flow or proportion of the electrolyte to be fed enters the entry opening of the return channel.

In this way, it can thus be achieved without further intervention that the flow through the transport channel changes again and again over time and in doing so alternates back and forth between at least two flow states. If the region of the feed channel adjacent to the cell interior is designed such that the two flow states result in the electrolyte to be fed flowing into the cell interior alternately at least substantially in different directions and/or via different outlet openings, accordingly also no constant flow distribution is formed in the cell interior. Rather, an at least varying flow distribution will occur in the cell interior. In this way, it can then be prevented that a constant flow distribution with dead spaces not flowed through or flowed through only to a limited extend is formed in the cell interior and in particular in the electrode. It is then more likely that fewer or smaller dead spaces will form over time and/or that the position of the dead spaces will change over time. In this way, it is finally achieved that the internal surface provided by the electrode can be used more effectively for the electrochemical reactions.

In this context, in the design of the feed channel, in particular of the transport channel, the fluidic basic principle can be used that a widening of the free flow cross section in the feed channel leads to the formation of a jet of electrolyte flowing into the region of the widening, which tends to lie against one side of the wall of the transport channel. In the region of this side of the wall, there is a higher flow velocity than on the opposite side of the wall. Depending on the extent to which the returned electrolyte influences the flow in this region, the flow will lie against different sides of the wall. Over a longer distance, the flow respectively its flow velocities would become more uniform again due to friction effects. The feed channel respectively transport channel should therefore not be designed too long, but should still be long enough to allow the flow to lie against different sides of the wall, which requires a certain distance of the flow.

Respective cell frames can be used particularly expediently if they form part of an electrochemical cell or even part of a respective cell stack. Here, the respective advantages already mentioned above are achieved, which can be used particularly profitably in connection with an electrochemical cell or with a cell stack, in particular of a redox flow battery. A respective electrochemical cell preferably has two cell interiors. In special cases, however, three or more cell interiors can be provided. If necessary, the individual cell interiors can preferably be separated from each other by semipermeable membranes. Furthermore, in the case of an odd number of cell interiors, a middle cell interior can be designed as a kind of mixed cell interior, one half of which belongs to the one half cell of the electrochemical cell and the other half of which belongs to the other half cell of the electrochemical cell.

In terms of the method, the cell frames described above allow electrolyte to be expediently fed into the cell interior of the cell frame of at least one half cell via at least one feed channel. When the electrolyte flows through the feed channel, it, in the course of this, passes a transport channel, preferably a flow chamber, of a transport channel. In the course of this, the electrolyte to be fed can form at least two different main flows. A main flow is understood to be that part of the flow which has the highest area-specific flow rate. In the regions of the feed channel that are flowed through in a non-uniform manner, there are sections flowed through more strongly and sections flowed through more weakly at the times of the non-uniform flow. In the course of this, the sections flowed through more strongly form the main flow, while the sections flowed through more weakly contribute much less to the volume flow of the flow of the electrolyte. If the flow through the respective regions were represented by flow lines, the flow lines along the main flow would lie close together, while the flow lines in the regions outside the main flow would be significantly more widely spaced from one another. In the main flow, the flow lines would run at least approximately or at least substantially parallel to each other, while the flow lines outside the main flow can run independent of each other. This can be the case, for example, if noteworthy turbulence of the electrolyte would occur in the regions outside the main flow, which should not or at least significantly less be the case in the main flow.

The main flow is not constant in time, but at least two different main flows can be observed at different points in time. In addition, the times of one main flow and the times of the other main flow alternate. However, each of the main flows is directed into the direction of the outlet opening, since the main portion of the electrolyte fed to the inside of the cell is fed into the cell interior via the main flow in each case. To the extent that the main flows alternate, the flow directions in which the main flow flows into the cell interior of the cell frame via the outlet opening also alternate. Thus, the flow of the electrolyte flowing into the cell interior and preferably also the flow of the electrolyte through the cell interior respectively through the electrode at least partially provided therein changes again and again or, if necessary, continuously.

In a first particularly preferred cell frame, the transport channel has, at least in sections between the at least one entry opening and the at least one exit opening in each case of the return channel, a flow chamber in such a way that leads to the electrolyte to be fed flowing alternately in at least two different main flows into the direction of the outlet opening through the flow chamber and, as a result this, flowing in at least two different outlet directions out of the outlet opening into the cell interior. In this way, a varying flow of the electrolyte into the cell interior and thus a higher power density can be achieved. In this context, it is particularly preferred if the flow chamber is designed such that the main flows alternate with each other at an at least substantially constant frequency. This makes the flow conditions more predictable, which makes it easier and more reliable to provide an increase of the power density. It may be even more expedient if the flow chamber is designed in such a way that the frequency increases, at least substantially linearly, with increasing volume flow through the transport channel. The greater the volume flow, the greater is the risk that a non-uniform flow with significant dead zones will form. Therefore, it is even more important if the frequency, with which the flow direction of the electrolyte from the feed channel into the cell interior varies, increases.

Alternatively or additionally, the transport channel can have, at least in sections between the at least one entry opening and the at least one exit opening in each case of the return channel, a flow chamber in such a way that the flow chamber forms at least in sections a free flow cross-section with a cross-sectional area which corresponds to at least 2 times, preferably at least 2.5 times, in particular at least 3 times, the cross-sectional area of the free flow cross-section of the inlet opening and/or of the outlet opening of the feed channel and/or of the transport channel. In this way, the electrolyte to be fed can enter into the larger cross-section of the flow chamber in the manner of a free jet and, depending on the flow conditions, for example, tend to lie against one side of the wall of the flow chamber or tend to lie against another side of the wall of the flow chamber. In this way, alternating main flows can be formed in the flow chamber, which on the one hand lead to alternating main flows and to alternating directions with which the electrolyte to be fed is conducted out of the feed channel into the cell interior.

If the cross-sectional area of the free flow cross-section of the outlet opening of the feed channel is larger than the cross-sectional area of the free flow cross-section of the outlet opening of the flow chamber, a widening of the feed channel can be provided at the end of the feed channel, which in turn allows to let the electrolyte flow out in different directions into the cell interior without additional moving parts in a simple manner. This is particularly the case if the transport channel widens in a funnel-shaped manner in this region, wherein, in order to simplify the feed channel, this widening can preferably be provided directly after the flow chamber in the transport direction of the electrolyte to be fed. Similarly, it is constructively simple if the transport channel is provided widened in a manner merging into the outlet opening of the feed channel.

A change of the flow of the electrolyte to be fed into at least two different main flows can be achieved particularly easily and reliably if the feed channel has at least two return channels for partially returning the electrolyte to be fed counter to the transport direction of the electrolyte to be fed in the transport channel. In this way, the deflection of the main flow in the region of the outlet openings of the return lines can be influenced via both return channels successively. For the sake of simplicity and reliability of the feed channel, it is useful if the return channels are arranged on mutually opposite sides of the transport channel. In addition, simple and purposeful return of the electrolyte can be achieved in particular if the return channels are unconnected among one another.

In order to achieve the most uniform possible flow through the cell interior, in particular the electrode provided there, it can be reasonable to provide at least two, preferably at least four, in particular at least six feed channels per cell frame. For the same reason, it is useful to provide the feed channels on the same sides of the cell frame. Irrespective of this, the feed channels can preferably be provided unconnected among one another in order to avoid mutual interference. Nevertheless, the various feed channels can be connected on the entry side to a common supply line, which can result in a relatively simple yet functional design of the cell frame. For the rest, the feed channels are then preferably provided continuously in parallel and separately from one another.

The advantages of the respective cell frame already described above are particularly effective in increasing the power density of electrochemical cells if a filling element with an open-pored structure is provided in the cell interior, the filling element preferably at least substantially completely filling the cell interior. In order to achieve a good flow through the open-pored structure and at the same time a good volume-specific reactivity, it can further be useful if the filling element is designed as one-piece filling element, felt-like, from graphite and/or as an electrode.

Irrespective of this, a more uniform flow through the cell interior can be provided, if necessary, in that the outlet channels and/or the feed channels of at least one cell frame are arranged at least substantially uniformly distributed over one side of the at least one cell frame. In this way, the available free flow cross-section can finally be better utilized and thus a higher power density can be achieved.

In a first particularly preferred electrochemical cell, the at least one cell interior is bounded peripherally by the cell frame, to one side by the semipermeable membrane and to the opposite side by an electrode or a bipolar plate. In this way, a simple and cost-effective structure of the electrochemical cell can be achieved, which is also highly functional. Alternatively or additionally, the cell interior and the cell frame can be arranged circumferentially in a frame plane. This also simplifies the structure of the electrochemical cell, in particular if many electrochemical cells shall be combined to a cell stack.

If the feed channel, the transport channel and/or the return channel is aligned at least substantially parallel to the frame plane, it is constructively simple to provide for suitable conduction of the electrolyte into the cell interior. This can be particularly the case if the feed channel, the transport channel and/or the return channel are arranged over their entire longitudinal extent in the frame plane.

In a first particularly preferred method, the flow of the electrolyte, when flowing through the transport channel, in particular when flowing through the flow chamber, changes temporally alternately between the at least two main flows. The change is to be understood here in particular as an automatic respectively compulsory change between the main flows during operation of the feed channel. In this context, it is not necessarily important how quickly or suddenly the change between the main flows occurs. However, it is further preferred if the change of the flow alternately into the at least two main flows occurs with constant frequency. This is because, then, in principle, a more uniform and thus more efficient flow through the cell interior can be achieved. In addition, it can be useful if the frequency of the change of the flow of the electrolyte to be fed into the at least two main flows is at least substantially proportional to the volume flow of the electrolyte to be fed. Then, as the volume flow increases, the flow of the electrolyte into the cell interior is temporally rapidly homogenized. This is preferred because the flow differences when flowing through the cell interior would otherwise increase with increasing volume flow.

Uniform flow of the electrolyte through the cell interior can also be achieved in that the at least two main flows are assigned to opposite sides of the flow chamber and, if necessary, also to opposite return channels. Then the desired flow conditions can be adjusted more easily and maintained more reliably. In order to supply the cell interiors with a larger volume flow of electrolyte in a constructively simple manner, it can be useful to distribute the electrolyte to be fed from at least one common supply line to multiple feed channels of at least one cell frame and feed the electrolyte to be fed in parallel via the feed channels to the cell interior.

BRIEF DESCRIPTION OF THE DRAWINGS

The invention is explained in more detail below by means of a drawing showing only an exemplary embodiment. The drawing shows FIG. 1A-B a cell stack according to the invention in the form of a redox flow battery in a longitudinal section, FIG. 2 a top view of a cell frame according to the invention of the cell stack from FIG. 1, FIG. 3 a detail of the cell frame from FIG. 3 and FIG. 4A-D the detail of the cell frame from FIG. 3 at different times during the operation of an electrochemical cell according to the invention comprising the cell frame from FIG. 2.

DESCRIPTION OF THE INVENTION

Figure 1A:
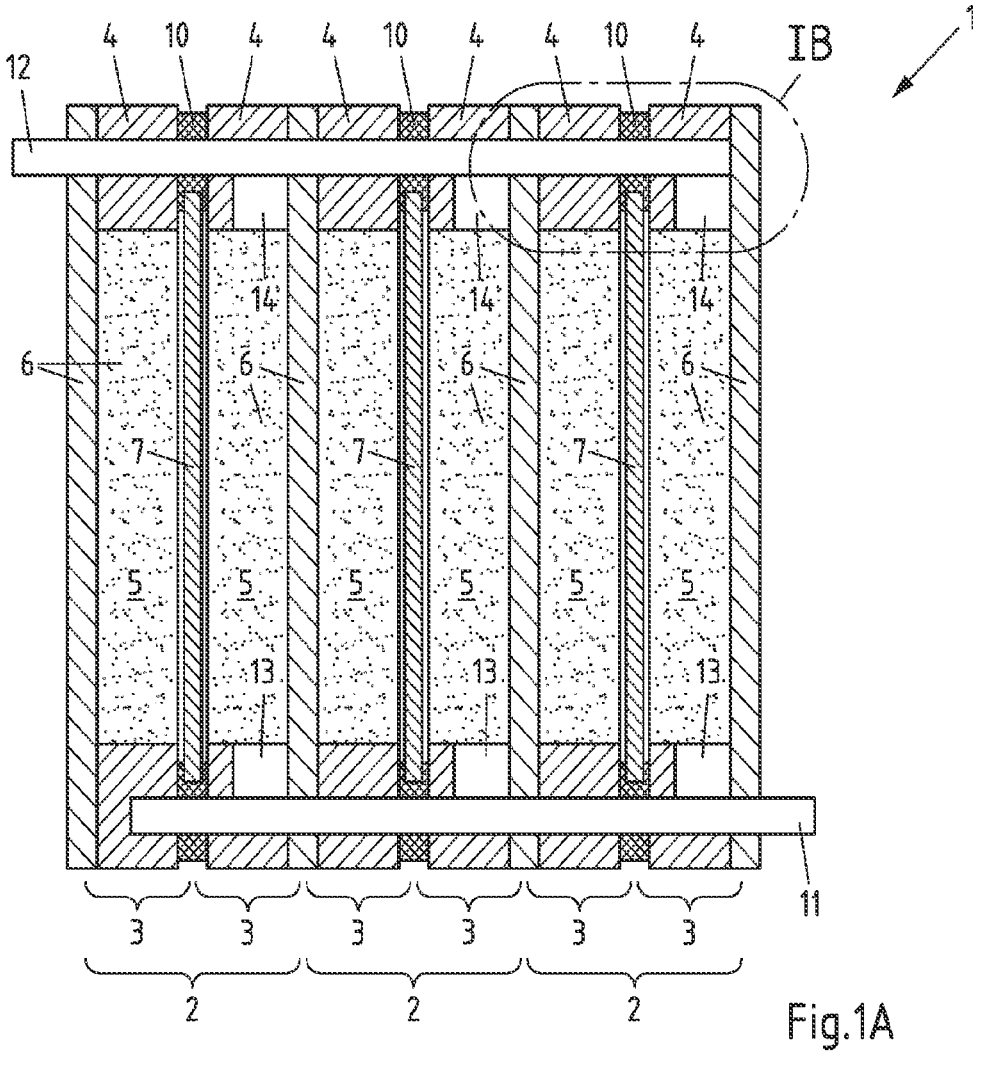
Figure 1B:
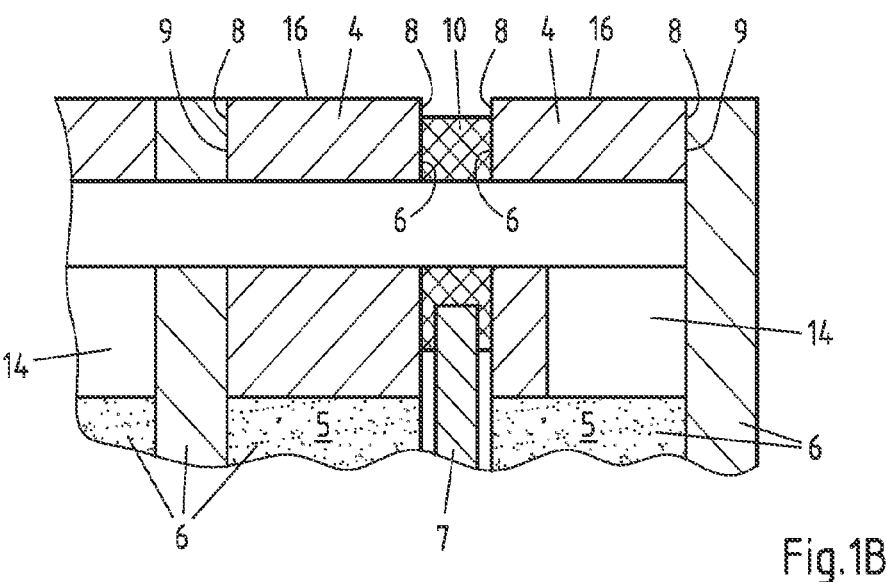

FIGS. 1A and 1B show a cell stack 1, i.e. a cell stack of an electrochemical cell, in particular in the form of a redox flow battery, in a longitudinal section. The cell stack 1 comprises three cells 2, each having two half cells 3 with corresponding electrolytes. Each half cell 3 has a cell frame 4 which comprises a cell interior 5 through which an electrolyte stored in a storage container can be conducted and into which an electrode 6 engages at least partially, which moreover completes and closes the cell interior 5 to one side. The electrolytes flowing through the cell interiors 5 differ from one another. The respective cell interior 5 is closed on the side facing away from the electrode 6 adjacent to the cell frame 4 of the second half cell 3 of the same electrochemical cell 2 by a semi-permeable membrane 7 provided between the cell frames 4 of the two half cells 3. Convective transfer of the two different electrolytes of the two half cells 3 into the cell interior 5 of the cell frame 4 of the other half cell 3 is thus prevented. However, ions can pass from one electrolyte to the other electrolyte by diffusion via the semipermeable membrane 7, whereby charge transport occurs. Due to redox reactions of the redox pairs of the electrolytes at the electrodes 6 of the half cells 3 of a cell 2, either electrons are released or accepted. The released electrons can flow from one electrode 6 to the other electrode 6 of a cell 2 via an electrical connection provided outside the redox flow battery and, if required, having an electrical consumer. At which electrode 6 which reactions take place depends on whether the redox flow battery is charged or discharged.

In the cell stack 1 shown, the electrodes 6 lie flatly on an outer side 8 of the cell frame 4. The electrode 6 thus forms a frame surface in the contact region with the outer side 8 of the cell frame 4, which frame surface acts as a sealing surface 9. Between the outer sides 8 of the cell frames 4 of a cell 2 facing each other is a sealing material 10 in which the membrane 7 is received in a sealing manner. The sealing material 10 lies flat against the outer sides 8 of the adjacent cell frames 4 and thus forms frame surfaces which act as sealing surfaces 9.

In the redox flow battery shown, four channels extend longitudinally to the cell stack 1. Two of these are supply lines 11 for feeding the two electrolytes to the cell interiors 5 of the cell frames 4. The two other channels are disposal lines 12 for discharging the electrolytes from the cell interiors 5 of the cell frames 4. FIG. 1A shows one supply line 11 and one disposal line 12 in each case. Feed channels 13 branch off from the supply line 11 in each case in one half cell 3 of each cell 2, via which feed channels 13 the electrolyte can be fed to the respective cell interior 5 of the half cell 3. Discharge channels 14 are provided at opposite sections of the respective cell frames 4, via which discharge channels 14 the electrolyte can be discharged from the cell interiors 5 into the disposal line 12. The supply line 11 not shown in FIG. 1A and disposal line 12 likewise not shown enable the second electrolyte to flow via similar feed channels 13 and discharge channels 14 through the respective other cell interiors 5 of the other half cells 3.

Figure 2:
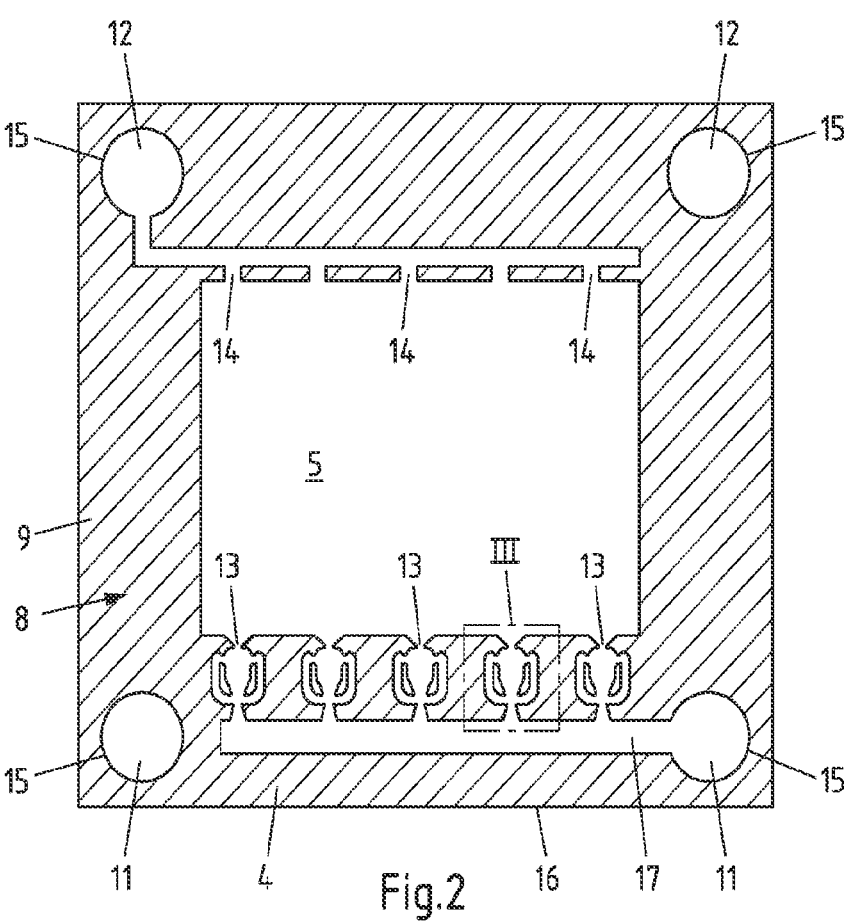

FIG. 2 shows a top view of a cell frame 4. Four bores 15 are provided in the corners of the cell frame 4, of which each bore 15 forms part of a supply line 11 or a disposal line 12. The feed channels 13 and discharge channels 14 are recessed as recesses or open channels into the shown outer side 8 of the frame shell 16 of the cell frame 4, the frame shell 16 being circumferential around the cell interior 5. The feed channels 13 and discharge channels 14 are closed to form peripherally closed lines during assembly to a cell stack 1. In the cell stack 1 shown, this is done, for example, by sealing materials 10 and the electrodes 6. However, the electrodes 6 could also be spatially separated from the supply lines 11 and the disposal lines 12 by sealing materials 10 and/or the electrical insulation of these materials. Alternatively or additionally, the sealing material 10 adjacent to the semipermeable membrane 7, the feed channels 13 and the discharge channels 14 could also be dispensed with.

In the shown embodiment, the discharge channels 14 are connected among one another in order to conduct the electrolyte to the disposal line 12 in a collected manner.

However, this is not necessary. The feed channels 13 can also all lead off separately from the supply line 11. In the shown embodiment of a cell frame 4, however, branches are provided in order to distribute the electrolyte fed via the supply line 11 to the feed channels 13 in a stepwise manner. To ensure that the pressure drop over the feed channels 13 and thus the flow through the feed channels 13 is as uniform as possible, the electrolyte is fed to the feed channels 13 via a collecting line 17 having a large free cross-section. The pressure loss of the flow of the electrolyte to be fed to the cell interior 5 is thus determined at least substantially by the pressure loss over the feed channels 13. In the shown embodiment of a cell frame 4, the feed channels 13 are designed differently from the discharge channels 14.

Figure 3:
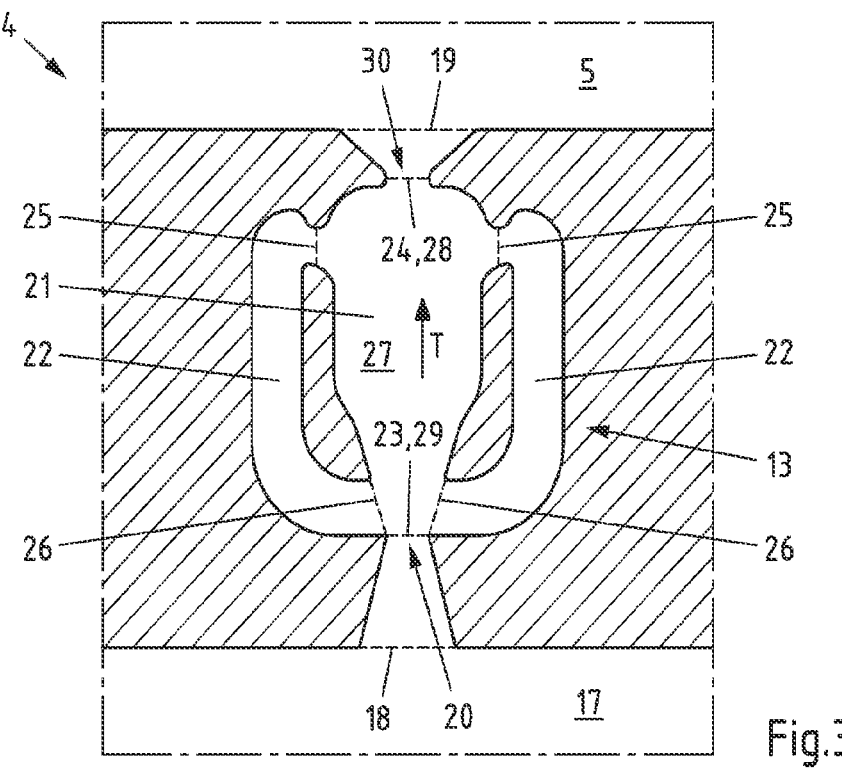

One of the similarly designed feed channels 13 of the cell frame 4 of FIG. 2 is shown in FIG. 3. The shown feed channel 13 has an inlet opening 18 and an outlet opening 19. The positions of the inlet opening 18 and the outlet opening 19 can be determined in the shown feed channel 13 so that the outlet opening 19 defines the direct transition from the feed channel 13 to the cell interior 5 and that the inlet opening 18 is arranged at the beginning of a widening of the free flow cross-section. In the case of the feed channel 13 shown, the inlet opening 18 can respectively be assumed to be at a constriction 20 of the free flow cross-section for the electrolyte. However, it is generally not necessary that a respective constriction 20 exists at which a narrowing free flow cross-section merges into a widening free flow cross-section. In the feed channel 13 shown, the inlet opening 18 for the electrolyte to be fed to the cell interior 5 is also provided shortly before or adjacent to a region of the feed channel 13 in which a transport channel 21 and two return channels 22 are connected to one another. The transport channel 21 serves to transport the electrolyte to be fed to the cell interior 5. Thus, the transport channel 21 connects, at least in sections, the inlet opening 18 and the outlet opening 19 of the feed channel 13 with each other.

In this case, the inlet opening 23 of the transport channel 21 can coincide with the inlet opening 18 of the feed channel 13, as is noted in the case of the feed channel 13 shown, or the inlet opening 23 of the transport channel 21 is spaced from the inlet opening 18 of the feed channel 13 in the transport direction T of the electrolyte to be fed into the direction of the cell interior 5. However, an opposite spacing of the inlet openings 18, 23 is not provided in principle. Analogously, the outlet opening 24 of the transport channel 21 can coincide with the outlet opening 19 of the feed channel 13 or, however, can be arranged before the outlet opening 19 of the feed channel 13 in the transport direction T of the electrolyte to be fed into the direction of the cell interior 5.

In addition to the transport channel 21, the feed channel 13 shown and preferred to that extent also comprises two return channels 22, which are arranged on opposite sides of the transport channel 21 and via which part of the electrolyte to be fed is returned instead of being fed to the cell interior 5. From the transport channel 21, the electrolyte to be returned enters the return channels 22 via the entry openings 25, in order to be returned along the return channels 22 counter to the transport direction T of the electrolyte in the transport channel 21, in order then to get back again into the transport channel 21 via exit openings 26.

The transport channel 21 comprises a flow chamber 27, which is arranged at least in sections between the exit openings 26 and the entry openings 25 of the return channels 22. The flow chamber 27 has a larger cross-sectional area of the free flow cross-section compared to the inlet opening 18 of the feed channel 13 and/or the inlet opening 23 of the transport channel 21. In this way, significantly different flow conditions can form in the flow chamber 27. In the case of the feed channel 13 shown and preferred to that extent, the cross-sectional area of the free flow cross-section of the outlet opening 19 of the feed channel 13 is larger than the cross-sectional area of the free flow cross-section of the outlet opening 28 of the flow chamber 27, so that the feed channel 13 widens after the flow chamber 27 in the direction of the cell interior 5 and thus enables that the electrolyte to be fed to the cell interior 5 can flow in different directions into the cell interior 5. This is also facilitated by the feed channel 13 merging into the cell interior 5 adjacent to the respective widening of the free flow cross-section. Since the transport channel 21 or the feed channel 13 widens in a funnel shaped-manner directly after the flow chamber 27 in the transport direction T of the electrolyte to be fed, the feed channel 13 is preferably designed relatively short.

In FIGS. 4A-D, the feed channel 13 is shown with electrolyte to be fed flowing through at different points of time. First, the basic flow conditions in the feed channel 13 are described by means of FIG. 4A, wherein reference is made in the following to the reference signs of FIG. 3 for the sake of clarity. The electrolyte to be fed flows into the feed channel 13 via the inlet opening 18 and then gets into the flow chamber 27 of the transport channel 21, in which the cross-sectional area of the free flow cross-section corresponds to approximately three or four times the cross-sectional area in the region of the inlet opening 23,29 of the transport channel 21 respectively of the flow chamber 27. Thus, after the inlet opening 23, in the region of the flow chamber 27, a kind of free jet into the flow chamber 27 is formed. Thus, the flow chamber 27 is not flowed through uniformly, but a main flow is formed which comprises at least the majority of the volume flow of the electrolyte to be fed. Outside the main flow in the flow chamber 27 of the transport channel 21, in contrast, the flow velocity is significantly lower, which is why significantly less electrolyte flows here. In addition, the portion of the electrolyte flowing there is also swirled to a large extent.

For basic fluid dynamic principles, the flow of electrolyte that enters the flow chamber 27 in the manner of a free jet will tend to lie against the wall of the flow chamber 27. According to the illustration of FIG. 4A, here the main flow of the electrolyte in the flow chamber 27 has lied against the left side of the flow chamber 27 and extends on this side into the direction of the end of the flow chamber 27 assigned to the cell interior 5 and thus into the direction of the outlet openings 19,24 of the transport channel 21 and of the feed channel 13 as such. Since the main flow flows along the left side of the flow chamber 27, the main flow gets at a certain angle into the direction of the end of the flow chamber 27 in the region of a constriction 30. At the constriction 30 respectively the taper of the flow chamber 27, the cross-sectional area of the free flow cross-section is about three or four times smaller than in a central section of the flow chamber 27. After the end of the flow chamber 27 respectively the constriction 30, the transport channel 21 respectively the feed channel 13 widens so that the free flow cross-section becomes larger. For this reason, the main flow of the electrolyte from the flow chamber 27 can also flow out of the outlet opening 19,24 of the transport channel 21 respectively of the feed channel 13 into the cell interior 5 at a similar angle at which the main flow flows into the constriction 30.

However, part of the main flow of the electrolyte does not get through the constriction 30, but is pushed into the return channels 22 through an entry opening 25 arranged in the transport direction T of the electrolyte before the end of the flow chamber 27. Along the return channels 22, the electrolyte to be returned is returned counter to the transport direction T of the electrolyte in the flow chamber 27 and is guided through the exit openings 26 in the region of the beginning of the flow chamber 27 respectively the beginning of the transport channel 21 back into the flow chamber 27 respectively the transport channel 21. There, the returned electrolyte interacts with the free jet of the electrolyte to be fed, the free jet being directed into the flow chamber 27.

Figures 4A, 4B, 4C, 4D:
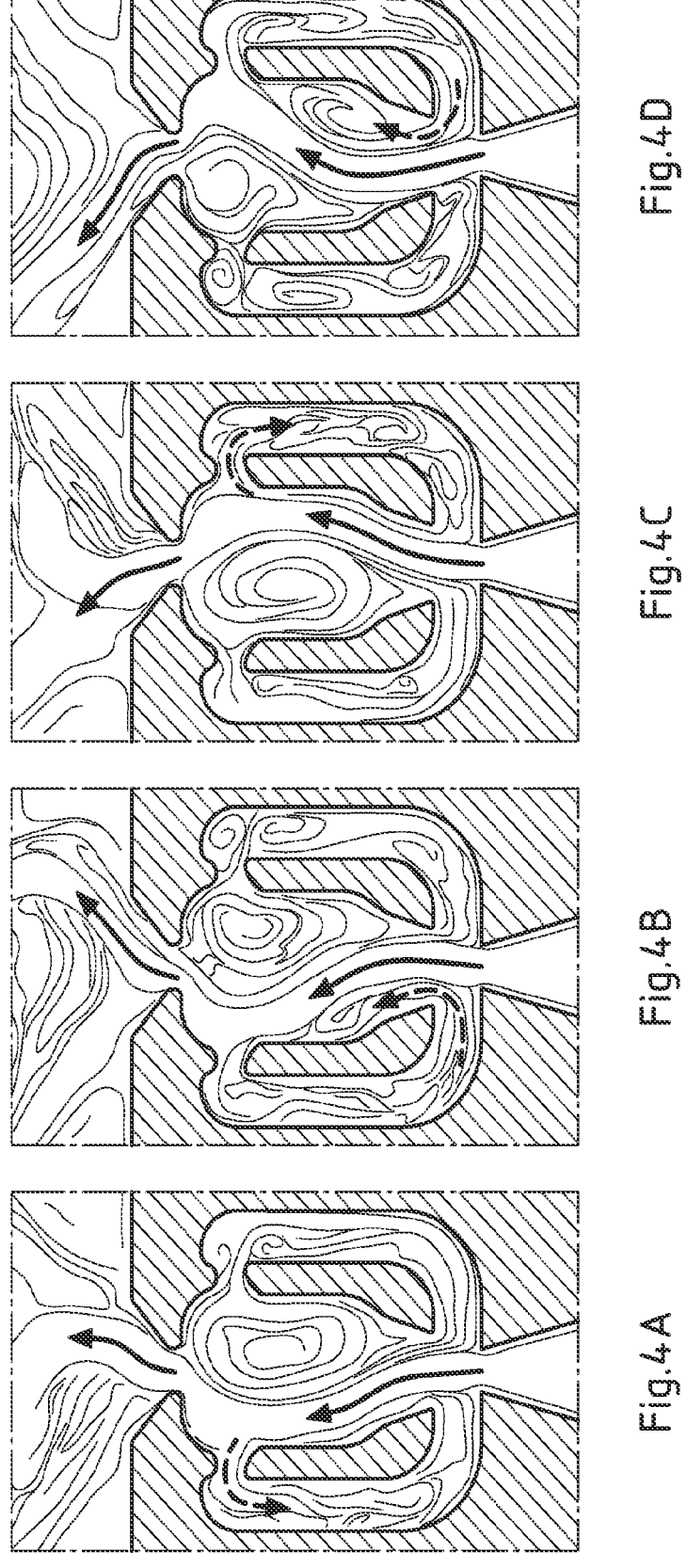

In the case shown in FIG. 4A, not the same volume flow of electrolyte is returned via the two return channels 22. Since the main flow of the electrolyte flows along the left side of the flow chamber 27, much more electrolyte is also pushed into the left return channel 22 than into the opposite right return channel 22. As a result of this, much more electrolyte also flows out of the exit opening of the left return channel 22. Since, in the case of the feed channel 13 shown and preferred to that extent, the returned electrolyte exits from the exit openings 26 approximately at right angles with respect to the original direction of the free jet, the free jet is deflected by the returned electrolyte to the right towards the wall of the flow chamber 27 there, as shown in the sequence of FIG. 4B. The main flow of the electrolyte to be fed thus changes after a certain time and then flows along the right side of the flow chamber 27 into the direction of the cell interior 5.

This is shown in FIG. 4C. The main flow then flows at an opposite angle into the constriction 30 at the end of the flow chamber 27 and, due to the design of the feed channel 13, also at a similar angle out of the feed channel 13 as well as into the cell interior 5. However, due to the relocation of the main flow in the flow chamber 27, more electrolyte is also returned via the right return channel 22 than via the left return channel 22, so that the returned electrolyte exiting from the right exit opening 26 of the right return channel 22 pushes the free jet in this region to the left again, as shown in FIG. 4D. As a result of this, the main flow of the electrolyte to be fed changes again back to the left, so that the previously described cycle takes place again. In the course of this, the cycle time and thus the respective frequency remains at least substantially constant if the volume flow of the electrolyte to be fed is also at least substantially constant.

LIST OF REFERENCE SIGNS

1 cell stack
2 cell
3 half cell
4 cell frame
5 cell interior
6 electrode
7 semipermeable membrane
8 outer side
9 sealing surface
10 sealing material
11 supply line

14

12 disposal line
13 feed channel
14 discharge channel
15 bores
16 frame shell
17 collecting line
18 inlet opening
19 outlet opening
20 constriction
21 transport channel
22 return channel
23 inlet opening
24 outlet opening
25 entry opening
26 exit opening
27 flow chamber
28 outlet opening
29 inlet opening
30 constriction
T transport direction

The invention claimed is:

1. A cell frame for an electrochemical cell peripherally enclosing at least one cell interior and comprising:

at least one feed channel for feeding electrolyte into the at least one cell interior, wherein the at least one feed channel has an inlet opening, spaced from the at least one cell interior, for the electrolyte to be fed and an outlet opening, adjacent to the at least one cell interior, for the electrolyte to be fed to flow out into the at least one cell interior, wherein the at least one feed channel has at least one transport channel, connecting at least in sections of the inlet opening with the outlet opening, configured to transport the electrolyte through the at least one feed channel into the at least one cell interior and at least one return channel configured to partially return the electrolyte to be fed counter to the transport direction (T) of the electrolyte to be fed in the at least one transport channel, and wherein the at least one return channel is in fluid contact with the at least one transport channel via in each case at least one entry opening for entry of the electrolyte to be returned and at least one exit opening for exit of the electrolyte to be returned, the at least one entry opening and the at least one exit opening being spaced from one another in the transport direction (T) of the electrolyte to be fed.

2. The cell frame according to claim 1, wherein the at least one transport channel has, at least in sections between the at least one entry opening and the at least one exit opening in each case of the at least one return channel, a flow chamber in such a way that the electrolyte to be fed can flow alternately at an at least substantially constant frequency, in at least two different main flows in a direction of the outlet opening through the flow chamber and, as a result of this, flow in at least two different outlet directions out of the outlet opening into the at least one cell interior, and wherein the flow chamber is designed in such a way that the substantially constant frequency increases, at least substantially linearly, with increasing volume flow through the at least one transport channel.

3. The cell frame according to claim 1, wherein the at least one transport channel has, at least in sections between the at least one entry opening and the at least one exit opening in each case of the at least one return channel, a flow chamber in such a way that the flow chamber forms, at least in sections, a free flow cross-section with a cross-sectional area which corresponds to at least 2 times the cross-sectional area of the free flow cross-section of the inlet opening and/or of the outlet opening of the at least one feed channel and/or of the at least one transport channel.

4. The cell frame according to claim 2, wherein the cross-sectional area of the free flow cross-section of the outlet opening of the at least one feed channel is larger than the cross-sectional area of the free flow cross-section of the outlet opening of the flow chamber, and wherein the at least one transport channel is designed to widen after the flow chamber in the transport direction (T) of the electrolyte to be fed in a funnel-shaped manner merging into the outlet opening of the at least one feed channel.

5. The cell frame according to claim 1, wherein the at least one feed channel has at least two return channels for partially returning the electrolyte to be fed counter to the transport direction (T) of the electrolyte to be fed in the at least one transport channel, wherein the at least two return channels are arranged on mutually opposite sides of the at least one transport channel, and wherein the at least two return channels are unconnected among one another.

6. The cell frame according to claim 1, wherein at least two feed channels are provided, and the at least two feed channels are provided on the same side of the cell frame and/or unconnected among one another, and wherein the at least two feed channels are connected on an entry side to a common supply line.

7. The cell frame according to claim 1, wherein a filling element with an open-pored structure is provided in the at least one cell interior, the filling element filling the at least one cell interior at least substantially completely, and wherein the filling element is designed as a one-piece filling element from graphite and/or as an electrode.

8. The cell frame according to claim 1, wherein the outlet channels and/or the feed channels of at least one cell frame are arranged at least substantially uniformly distributed over one side of the at least one cell frame.

9. An electrochemical cell comprising two half cells, wherein the two half cells are separated from one another by at least one semipermeable membrane, wherein the two half cells each have at least one cell frame peripherally enclosing at least one cell interior for electrolyte to flow through, and wherein at least one cell frame is designed according to claim 1.

10. The electrochemical cell according to claim 9, wherein the at least one cell interior is bounded peripherally by the at least one cell frame, to one side by the semipermeable membrane and to the opposite side by an electrode or a bipolar plate, and/or wherein the at least one cell interior and the cell frame are arranged circumferentially in a frame plane.

11. The electrochemical cell according to claim 10, wherein the at least one feed channel, the at least one transport channel and/or the at least one return channel is aligned at least substantially parallel to the frame plane and wherein the at least one feed channel, the at least one transport channel and/or the at least one return channel is arranged over its entire longitudinal extent in the frame plane.

12. A cell stack comprising a plurality of electrochemical cells arranged side by side, adjacent to one another and firmly connected among one another, wherein the plurality of electrochemical cells are designed according to claim 9.

13. A method of operation of an electrochemical cell according to claim 9, the method comprising the steps of:
    feeding the electrolyte to the at least one cell interior of the at least one cell frame of at least one half cell via a feed channel; and
    flowing the electrolyte through the at least one transport channel in a flow chamber, wherein when the electrolyte is flowing through the at least one transport channel in the flow chamber, the electrolyte forms temporally alternately at least two different main flows in a direction of the outlet opening and, as a result of this, flows alternately in at least two different outlet directions out of the outlet opening into the at least one cell interior.

14. The method according to claim 13, wherein the electrolyte, when flowing through the at least one transport channel in the flow chamber, changes temporally alternately between the at least two main flows with constant frequency, and wherein the frequency of the change of the flow of the electrolyte to be fed alternately into the at least two main flows is at least substantially proportional to a volume flow of the electrolyte to be fed.

15. The method according to claim 13, wherein the at least two main flows are assigned to opposite sides of the flow chamber and opposite return channels, and/or wherein the electrolyte to be fed is distributed from at least one common supply line to multiple feed channels of at least one cell frame and fed in parallel via the multiple feed channels to the at least one cell interior.

16. The cell frame according to claim 1, wherein the at least one transport channel has, at least in sections between the at least one entry opening and the at least one exit opening in each case of the at least one return channel, a flow chamber in such a way that the flow chamber forms, at least in sections, a free flow cross-section with a cross-sectional area which corresponds to at least 2.5 times the cross-sectional area of the free flow cross-section of the inlet opening and/or of the outlet opening of the at least one feed channel and/or of the at least one transport channel.

17. The cell frame according to claim 1, wherein the at least one transport channel has, at least in sections between the at least one entry opening and the at least one exit opening in each case of the at least one return channel, a flow chamber in such a way that the flow chamber forms, at least in sections, a free flow cross-section with a cross-sectional area which corresponds to at least 3 times the cross-sectional area of the free flow cross-section of the inlet opening and/or of the outlet opening of the at least one feed channel and/or of the at least one transport channel.

18. The cell frame according to claim 1, wherein at least four feed channels are provided, wherein the at least four feed channels are provided on the same side of the cell frame and/or unconnected among one another, and wherein the at least four feed channels are connected on an entry side to a common supply line.

19. The cell frame according to claim 1, wherein at least six feed channels are provided, wherein the at least six feed channels are provided on the same side of the cell frame and/or unconnected among one another, and wherein the at least six feed channels are connected on an entry side to a common supply line.

* * * * *